(12) United States Patent
Leining (10) Patent No.: US 6,244,951 B1
(45) Date of Patent: Jun. 12, 2001

(54) HOG CARCASS CONFIGURER

(75) Inventor: Lyndon R. Leining, Austin, MN (US)

(73) Assignee: Hormel Foods, LLC, Austin, MN (US)

( * ) Notice: Subject to any disclaimer, the term of this patent is extended or adjusted under 35 U.S.C. 154(b) by 0 days.

(21) Appl. No.: 09/561,854

(22) Filed: Apr. 28, 2000

(51) Int. Cl.$^7$ .................................................. A22B 1/00
(52) U.S. Cl. ........................... 452/185; 452/134; 452/187
(58) Field of Search .................................. 452/185, 134, 452/187, 197, 198

(56) References Cited

U.S. PATENT DOCUMENTS

| | | |
|---|---|---|
| 3,245,107 | 4/1966 | Kolman . |
| 4,009,652 | 3/1977 | Anderson ............................... 99/590 |
| 4,653,150 * | 3/1987 | Leining ................................ 452/160 |
| 4,727,623 | 3/1988 | Durand . |
| 5,062,820 * | 11/1991 | Rankin et al. ....................... 452/187 |
| 5,129,856 | 7/1992 | Hahn et al. .......................... 452/128 |
| 5,180,328 | 1/1993 | Davis ................................. 452/128 |
| 5,785,588 * | 7/1998 | Jacobs et al. ........................ 452/134 |

FOREIGN PATENT DOCUMENTS

| | | | |
|---|---|---|---|
| 133427 * | 1/1979 | (DE) .................................... 452/187 |
| 365452 * | 4/1990 | (EP) .................................... 452/187 |
| 406793 * | 3/1934 | (GB) .................................... 452/187 |

* cited by examiner

Primary Examiner—Willis Little
(74) Attorney, Agent, or Firm—Mau & Krull, P.A.

(57) ABSTRACT

An apparatus (10) configures animal carcasses (C) for processing by leaf lard puller. The apparatus (10) includes a frame (20) with a carriage (40) operatively connected to the frame (10) for movement and in alignment with a conveyor suspending a hog carcass (C). A connecting member (60) has a first end operatively connected to the carriage (40) and a second end moveable between a first position and a second position. A pair of opposable arms (72, 73) are movable between an open position and a configuring position. The arms (72, 73) are positioned around the hog carcass in the open position and as the arms move to the configuring position, the hog carcass (C) is moved to the desired width for further processing by a leaf lard puller.

17 Claims, 7 Drawing Sheets

HOG CARCASS CONFIGURER

BACKGROUND OF THE INVENTION

1. Field of the Invention

This invention relates generally to a carcass configurer, and more particularly to a hog carcass configurer to enable an American-style hog to be used with a European-style leaf lard puller.

2. Description of the Prior Art

In commercial meat packing operations, animals, such as hogs, are slaughtered, bled, skinned, eviscerated and the carcass is then cut into halves before it is chilled. The carcasses are suspended from an overhead rail and are moved by a conveyor on the rail. Prior to being cut in halves, they are cut open along the abdominal face and along the rib cage, thus providing an access of extracting the viscera and the offals. After this operation, the hogs are brought to a leaf lard puller where the leaf lards are removed. One model of a leaf lard puller is the Stork FLR leaf lard puller produced by Stork MPS B.V. from Holland.

However, the Stork leaf lard puller and any other leaf lard puller that is manufactured for use in Europe is made for use with "European" style hogs. That is, when the European-style hogs are cut open along the abdominal face, they are prepared such that the hogs typically have a width of approximately 16 inches. Operating standards in the United States are different and the hogs have a width of approximately 22 inches. Therefore, when a European-style leaf lard puller is attempted to be used with an American-style hog, the leaf lard puller does not work. The American-style hogs are too far apart and the leaf lard puller is not able to be properly used when the hog carcass is separated too far apart.

The leaf lard pullers are positioned adjacent the overhead conveyor and move along with the hogs as the hogs are transported on the overhead conveyors. The leaf lard pullers operate "on the fly". Therefore, there is a need to be able to adapt the American-style hogs for use with a European-style leaf lard puller.

SUMMARY OF THE INVENTION

In one embodiment, the invention is an apparatus for configuring an animal carcass for processing by a leaf lard puller. The carcass has been split longitudinally through its backbone. The carcass is suspended by an overhead conveyor. The apparatus includes a frame and a carriage operatively connected to the frame for movement and alignment with a conveyor suspending a hog. A connecting member has a first and second end. The first end is operatively connected to the carriage and the second end is movable between a first position and a second position. A pair of opposable arms are operatively connected to the connecting member approximate its second end. The arms are movable between an open position and a configuring position. A drive mechanism is provided for moving the carriage on the frame, wherein the arms are positioned around the hog carcass in the open position and as the arms are moved to the configuring position, the hog carcass is moved to the desired size for use with a leaf lard puller.

In another embodiment, the invention is a method of configuring a split hog carcass for processing by a leaf lard puller as the carcass is moved along a conveyor. The method includes moving a connecting member from a first position to a second position, wherein the arms are positioned around a hog carcass. Moving the arms from an open position to a configuring position, wherein the hog carcass is configured to be processed by a leaf lard puller. The arms are then moved back to an open position and the connecting member is moved back to the first position.

In another embodiment, the invention is an apparatus for configuring an animal carcass for processing by a leaf lard puller. The carcass has been spread longitudinally through its backbone. The carcass is suspended on a conveyor. The apparatus includes a frame and a carriage operatively connected to the frame for movement and alignment with a conveyor suspending a hog. A connecting member is operatively connected to the carriage and is movable between a first position and a second position. A pair of opposable arms are operatively connected to the connecting member and movable between an open position and a configuring position. A drive mechanism is provided for moving the frame from an ending position to a starting position, whereby the frame is moved from the starting position to the ending position by phasing movement of the carriage with movement of the hog by the opposable arms in the configuring position around the hog.

DETAILED DESCRIPTION OF THE PREFERRED EMBODIMENT

Referring to the drawings, wherein like numerals represent like parts throughout the several views, there is generally disclosed at 10 a hog carcass configurer. The configurer 10 has a frame 20 in the general shape of a rectangle. The frame 20 includes a front member 21 operatively connected to a back member 22 by cross members 23 and 24. The frame may be connected by suitable means, such as welding. Secured to the cross members 23, 24 by suitable means such as welding are connecting members 25. The connecting members are utilized to connect the frame 20 to the super structure of the building in which the configurer 10 is located. In this manner, the configurer 10 is suspended by the connecting members 25. Other suitable means of supporting the frame may also be utilized. A drive motor 26 is operatively connected to a plate 27 which is in turn connected to the cross member 24 by an angled bracket 28. The motor 26 is positioned to drive a drive pulley mechanism 29 that includes a drive pulley 29a. At the opposite end of the frame 20 an idler pulley 30 is connected to a bracket 31 which is in turn connected to the frame 20. Extending around the pulleys 29a and 30 is a drive belt 32.

Figure 1:
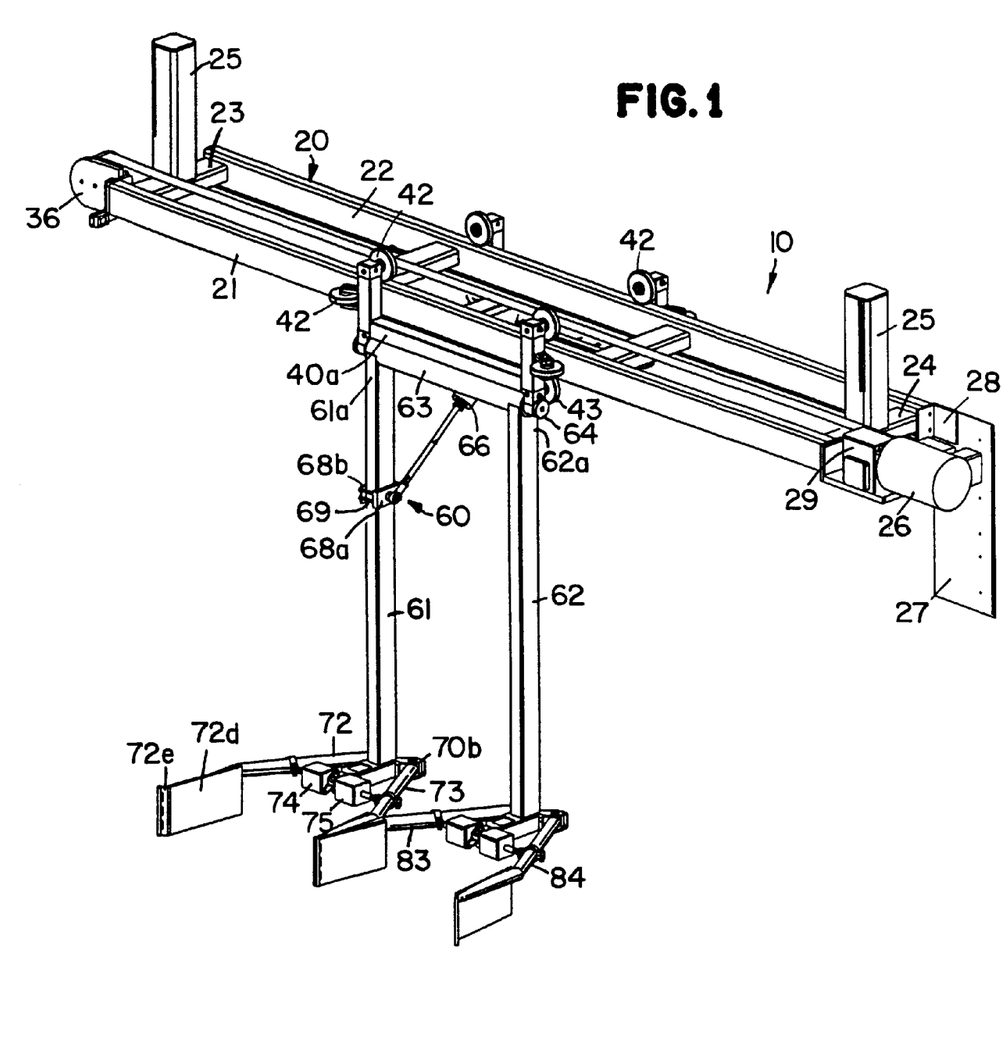
FIG. 1 is a perspective view of the hog carcass configurer of the present invention.
Figure 2:
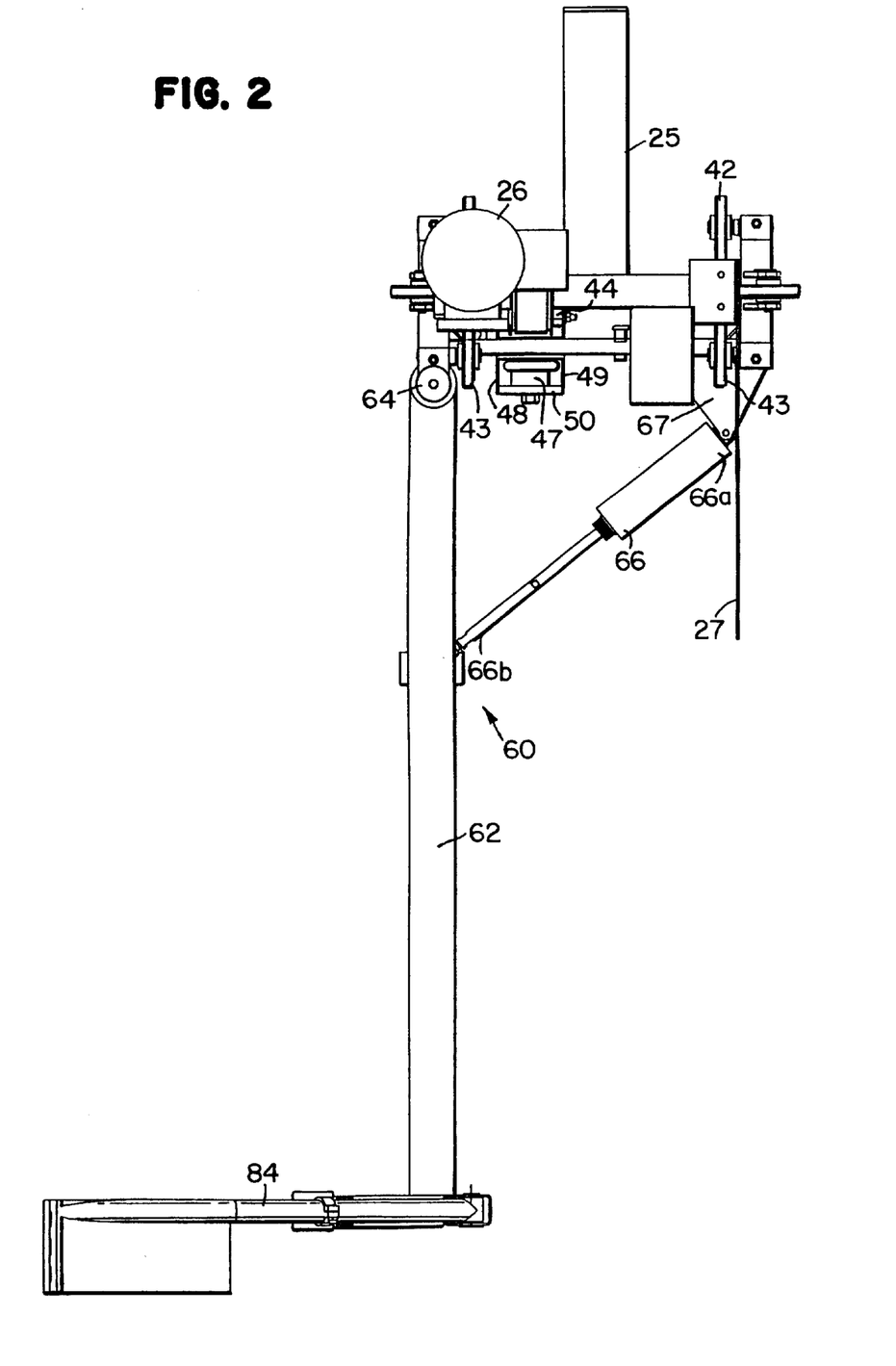
FIG. 2 is a side elevational view of the hog carcass configurer shown in FIG. 1.
Figure 3:
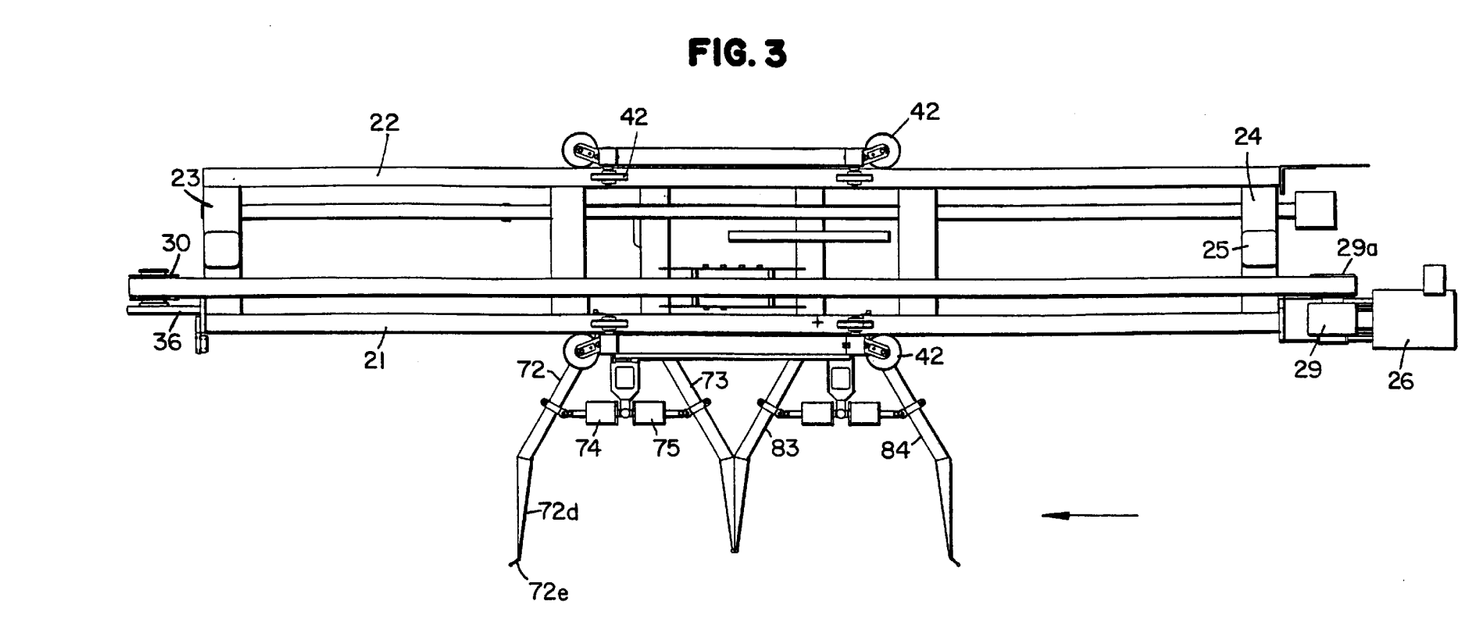
FIG. 3 is a top plan view of the hog carcass configurer shown in FIG. 1.
Figure 4:
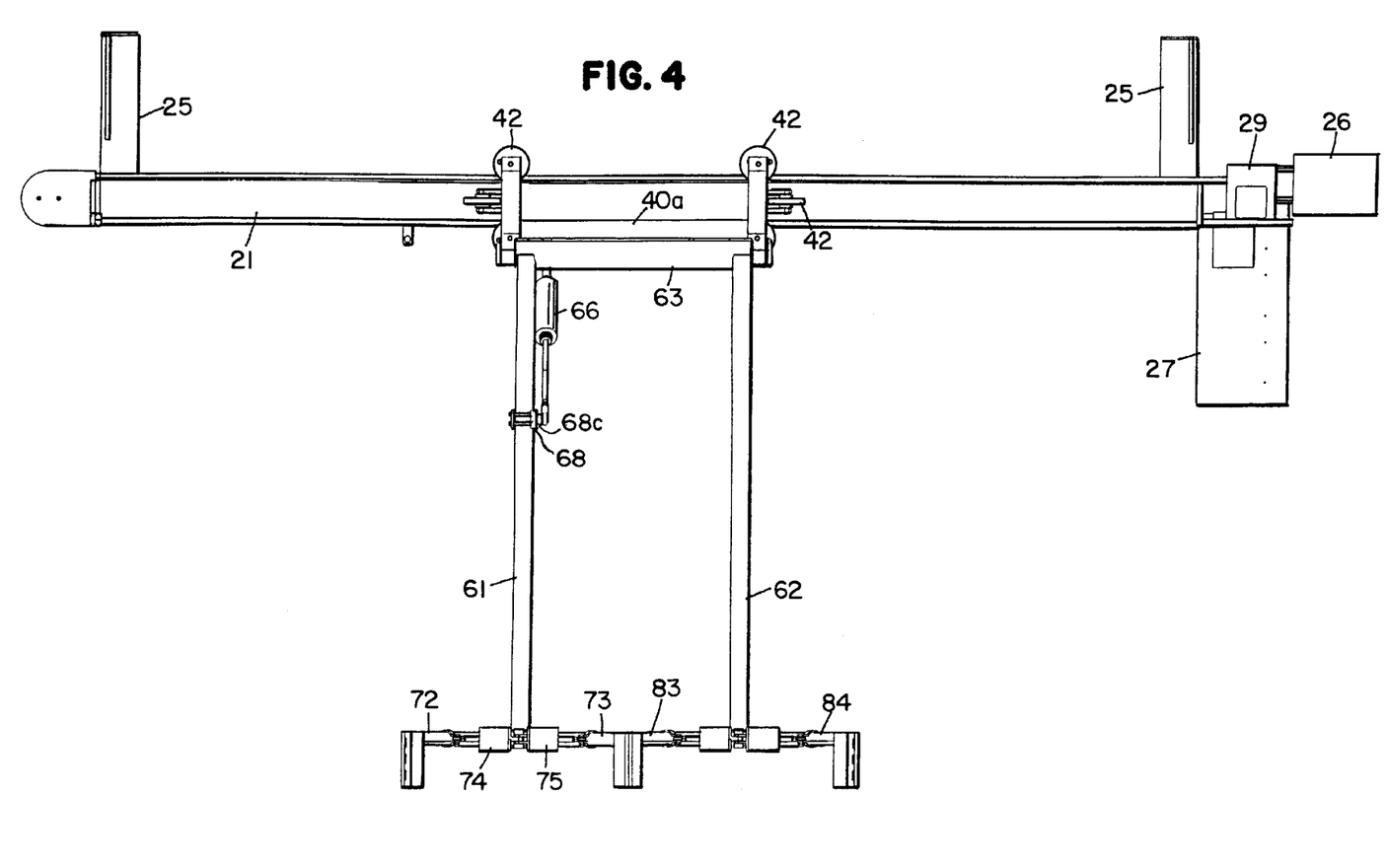
FIG. 4 is a front elevational view of the hog carcass configurer shown in FIG. 1.
Figure 5:
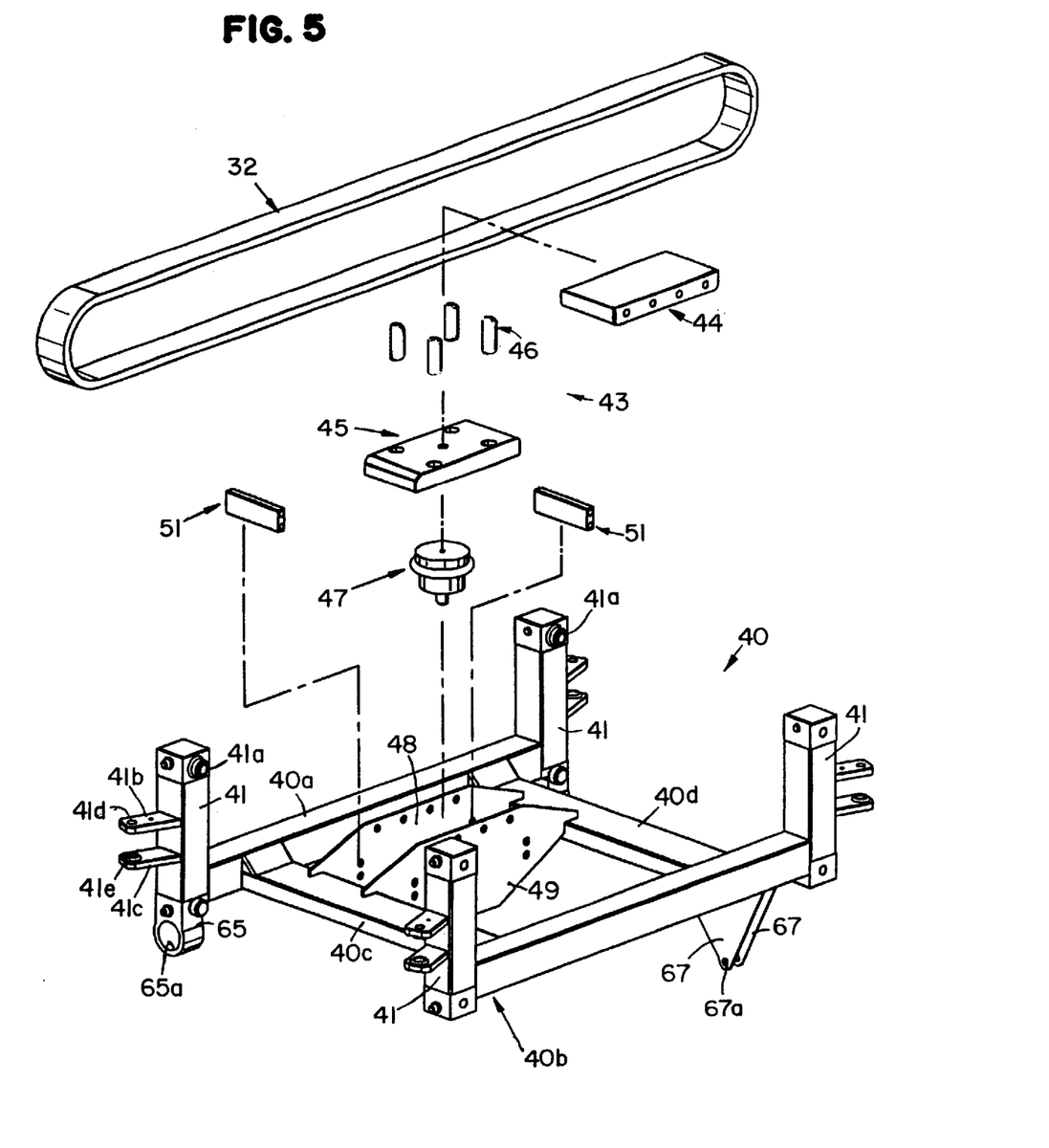
FIG. 5 is an exploded perspective view of the carriage for the hog carcass configurer shown in FIG. 1.

A carriage, generally designated at 40, is best seen in FIG. 5. The carriage 40 is movable along the frame 20. The carriage 40 includes a front member 40a and a back member 40b operatively connected by side members 40c, 40d, by suitable means such as welding. Four support posts 41 are operatively connected to the carriage 40 at its corners. The posts 41 all have an upper section in which an opening 41a is formed. The axle of a guide wheel 42 is secured in the opening 41a and allows for rotation of the guide wheel 42. Similarly, mounting flanges 41b, 41c are operatively connected to the post 41. The mounting flanges 41b, 41c have openings 41d, 41e in which the axle of the guide wheel 42 is positioned. The eight upper guide wheels 42 are shown in FIG. 3. Four of the guide wheels 42 ride on top of the frame 20, two guide wheels 42 on the front side of the frame 20 and two guide wheels 42 on the back side of the frame 22. In addition, there are four bottom guide wheels 43 which are similarly mounted to the bottom of the posts 41 and, when in position, are on the underneath side of the front members 21 and 22 of the frame 20. The guide wheels 42 and 43 therefore mount the carriage 40 to the frame 20 and allow for the movement of the carriage 40 along the frame 20.

A clutch mechanism, generally designated at 43, includes an upper belt clamp plate 44, lower belt clamp plate 45, four springs 46 and an air stroke actuator 47. Mounting for the clutch mechanism 43 is provided by front plate 48 and rear plate 49 which are operatively connected between the sides 40c, 40d by suitable means such as welding. A bottom 50 is secured between the front plate 48 and rear plate 49. The air stroke actuator 47 is mounted in the bottom 50. Spacers 51 are secured between the front plate 48 and rear plate 49 by suitable means such as bolts. The upper plate 44 is secured by suitable means, such as four bolts (not shown) at the top of the plates 48, 49. The upper belt clamp plate is positioned on one side of the drive belt 32 and the lower belt clamp plate 45 is positioned on the other side of the drive belt 32. Springs 46 are positioned between the plates 44, 45. The springs 46 normally bias the plates 44, 45 away from each other, thereby allowing the belt 32 to pass between the plates. Upon actuation of the air stroke cylinder 47, the cylinder moves upward urging the lower plate 45 upwards against the upper belt clamp plate 44 which is held stationary between the plates 48, 49. This then squeezes the belt 32 between the plates 44, 45, thereby carrying the plates 44, 45, and hence the carriage 40 when the belt 32 is driven.

A connecting member is generally designated at 60. The connecting member 60 includes a first member 61 and a second member 62 operatively connected to a cylinder 63. The first ends 61a, 62a are connected to the cylinder 63 by suitable means such as welding. The cylinder 63 has a longitudinal bore therethrough through which a circular shaft 64 is inserted. The shaft 64 is mounted to the carriage 40. One way of mounting the shaft 64 is to mount the shaft 64 in two flanges 65, see FIG. 5. The flanges 65 are suitably connected to the front supports 41 by suitable means such as welding. The flanges 65 have an opening 65a in which the shaft 64 is positioned. The shaft is secured by means well known in the art. Therefore, it can be seen that the connecting member 60 is rotatable around the shaft 64. The connecting member 60 is rotated on the shaft 64 by an air cylinder 66. The air cylinder 66 has a first end 66a that is pivotally mounted between two plates 67 that are suitably connected to the carriage 40 by suitable means such as welding. The plates 67 have openings 67a through which the first end 66a is pivotally mounted. The second end 66b of the air cylinder 66 is an extendable rod that is operatively connected to the first member 61. A bracket 68 includes a first plate 68a that is positioned on one side of the first member 61 and a second plate 68b which is positioned on the other side of the member 61. The plates 68a, 68b are secured together by bolts 69. The second plate 68b has an extension 68c on which the second end 66b is connected. As shown in FIGS. 1 through 4, the second end 66b is extended thereby placing the connecting member in a second position. When retracted, the connecting member is in a first position, which, when viewed in FIG. 2, would move the connecting member 60 in a counterclockwise direction.

Figure 7:
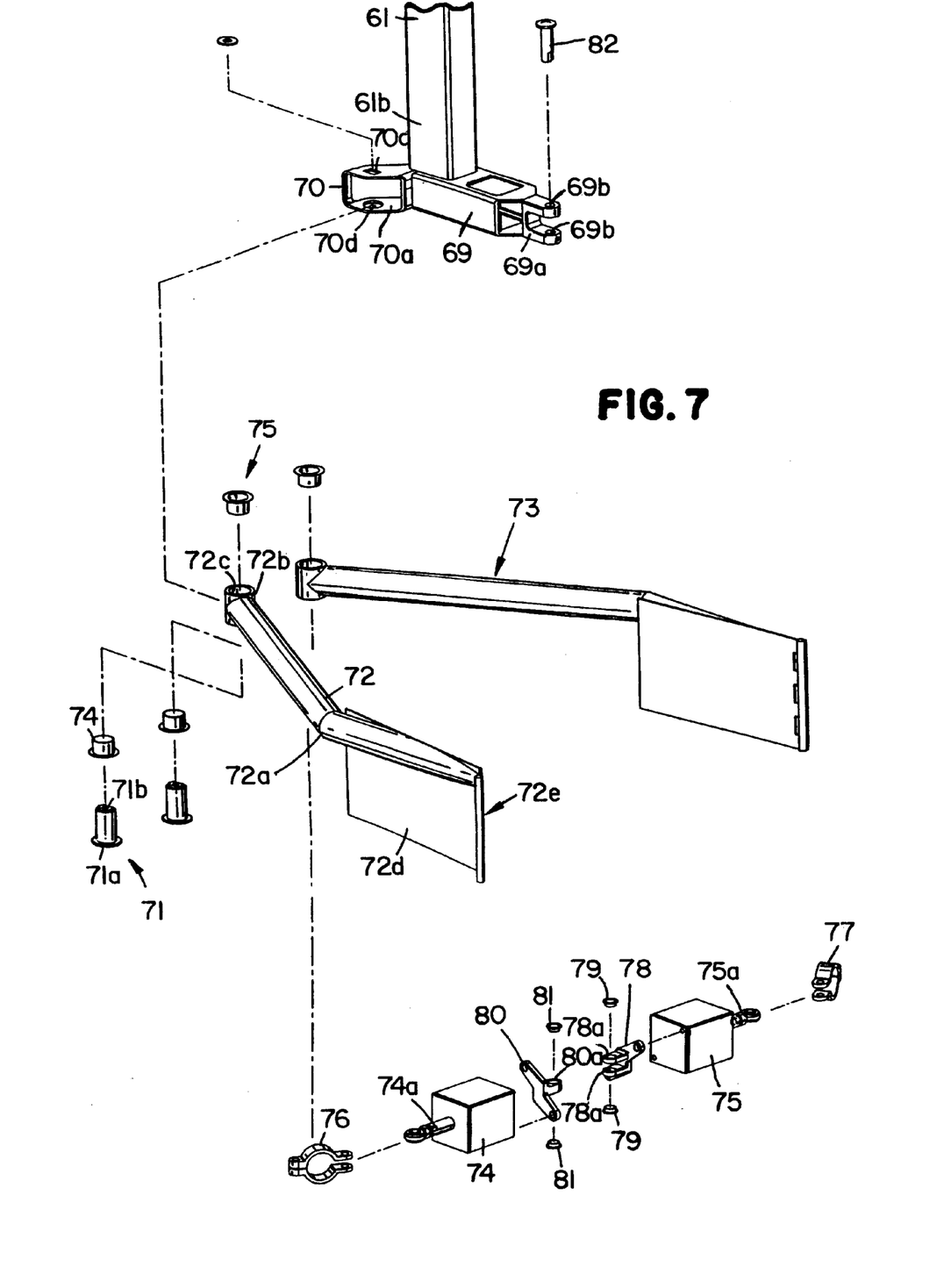
FIG. 7 is an exploded perspective view of a portion of the hog configurer shown in FIG. 1.

A pair of opposable arms are operatively connected to the members 61 and 62. Each of the pair are identical and accordingly only one will be described in detail. FIG. 7 shows an exploded perspective view of the pair of opposable arms operatively connected to the first member 61. A first bracket 69 is operatively connected to the bottom of member 61 by suitable means such as welding. The bracket 69 includes a U-shaped end 69a that has two openings 69b formed therein. A second bracket 70 is operatively connected, by suitable means such as welding, to the back of the first bracket 69. The bracket 70 has two sections that are mirror images of each other. The first section 70a is seen most clearly in FIG. 7. The second section 70b is shown in less detail in FIG. 1. However, as previously stated, the sections 70a and 70b are mirror images of each other. The first section 70a has a rectangular opening 70c formed in its top surface and a circular opening 70d formed in the bottom surface. A shaft 71 is utilized to pivotally connect the first arm 72 to section 70a of the second bracket 70. Second arm 73 is a mirror image of first arm 72. The first arm 72 includes an angled elongate member 72a that has at one end a cylinder 72b having a bore 72c. At its other end is secured a rectangular plate 72d. Secured at the end of the plate 72d is a smaller rectangular plate 72e. The shaft 71 has a circular head 71a at one end and a rectangular protrusion 71b at its other end. Bearings 74 and 75 are placed in the bore 72c. The cylinder 72c is then placed inside of the section 70a of second bracket 70 and the shaft 71 is inserted through the opening 70d. The rectangular protrusion 71b is sized and configured to fit in the opening 70c thereby preventing rotation of the shaft 71. However, the arm 72 is free to rotate around the shaft 71. The second arm 73 is similarly pivotally mounted to the second section of bracket 70. Two air cylinders 74 and 75 are operatively connected between the opposable arms 72, 73. A first clamp 76 is secured to the arm 72 and a second clamp is secured to the arm 73. The air cylinder 74 has a rod end 74a that is connected to the clamp 76 by suitable means, such as a bolt and nut (not shown). Similarly, the air cylinder 75 has a rod end 75a that is similarly connected to the second clamp 77. A bracket 78 is secured to the air cylinder 75 by suitable means such as screws (not shown). The bracket 78 has a U-shaped flange, with each flange having an opening 78a formed therein. Bushings 79 are inserted in the opening 78a. Another bracket 80 is secured to the first air cylinder 74 by suitable means such as screws (not shown). A cylindrical flange is formed on the bracket 80 and has an opening 80a in which bearings 81 are inserted. The openings 78a, 80a are aligned and placed in the U-shaped member 69a so as to be in alignment with the opening 69b. Then a pin 82 is inserted thereby securing the air cylinders to the bracket 69. Operation of the air cylinders 74, 75 cause the cylinder rod ends 74a, 75a to extend and retract. As shown in the Figures, the opposable arms 72, 73 are at their maximum distance apart, or an open position. When the rod ends 74a, 75a are retracted, the opposable arms are brought closer together to a configuring position.

Another set of opposable arms 83, 84 are similarly constructed and secured to the second member 62. However, the construction of which being identical to the opposing arms 72, 73. The hog carcass configurer 10 is therefore set up to handle two hog carcasses at once. However, it being understood that if the leaf lard puller would only be set up to handle one hog carcass, then the second pair of opposable arms would not be necessary.

Figure 6:
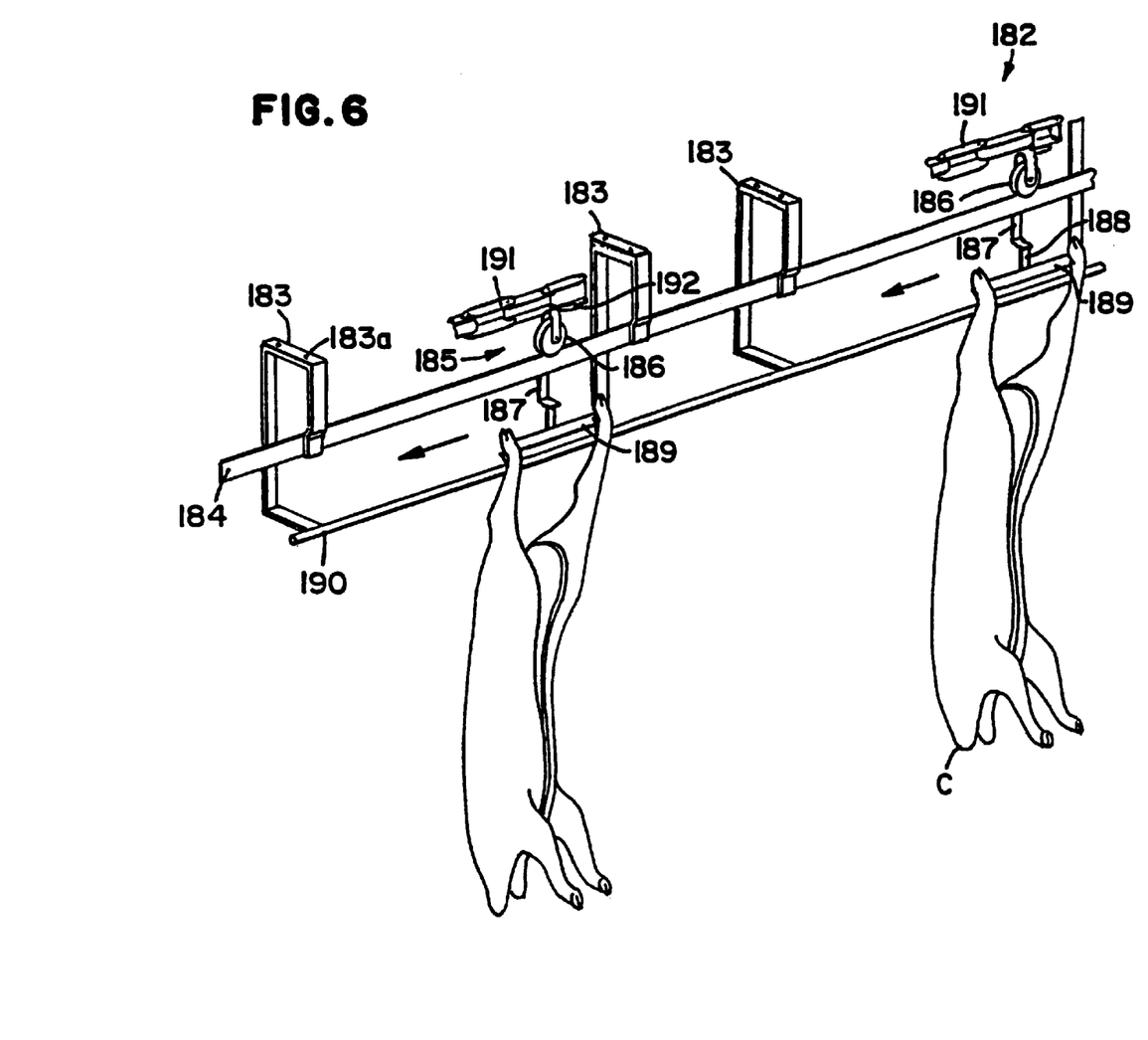
FIG. 6 is a perspective view of an overhead trolley used in conjunction with the hog carcass configurer shown in FIG. 1.

Referring to FIG. 6, the hog carcass C is moved into position for the leaf lard pulling operation by an overhead conveyor device, generally designated as 182. The overhead conveyor device 182 includes a plurality of hanger brackets 183 which are secured to a permanent structure, such as beams, ceiling or the like and which support and elongate guide rail 184. Each hog carcass C is suspended from a trolley 185. The trolley 185 includes a trolley wheel 186 that engages and moves along the guide rail 184. A trolley frame 187 is suspended from the trolley wheel 186 and is provided with a hook 188 at its lower end for engaging and supporting an elongate gambrel 189. The gambrel 189 projects through incisions in the hind feet of the hogs in a well-known manner. A guide bar 190 is secured to the hanger bracket 183 and is engaged by the hind legs of the hog during the splitting operation. A chain 191 is a continuous chain, but for clarity purposes has been shown broken away in FIG. 12. The chain 191 has a well known guide (not shown) which mounts to the top of the brackets 183 through the holes 183a. The chain 191 runs within the guide and provides a motive force for the trolley 185. A plurality of fingers 192 project from the chain 191 and engage the trolley 185 via the trolley frame 187. Such an overhead conveying device is well known in the art. The direction of travel of the overhead conveyor device 182 is shown by the arrows in FIG. 6. The carcass shown on the right is being transported to the hog configurer 10.

The overhead conveying device 182 is generally parallel to the frame 20 and is positioned to deliver the hog carcass C to the opposable arms 72, 73. The leaf lard puller is similarly in a generally parallel orientation to the frame 20 and overhead conveyor device 182. The hog carcass C is positioned between the frame 20 and the leaf lard puller.

In operation, the air cylinder 66 is retracted thereby moving the connecting member 60, and therefore the arms 61, 62 in the second position, as shown in the Figures, to a first position which pivots the arms out of the way of the hog carcasses C as they are being delivered by the overhead conveyor 182. The opposable arms are in an open position at this stage, as shown in the Figures. A suitable sensing device senses the presence of the hog's carcass C and actuates the cylinder 66 to the second position. The air cylinders 74, 75 are then actuated to retract the rods 74a, 75a, thereby closing the opposable arms. In closing, the arms squeeze the hog carcass C from a first width to a second smaller width. The width that the hogs are typically delivered is 22 inches. Then, upon closing, the opposable arms 72, 73 configure the hogs to have an opening of 16 inches which is the standard for American sized split hog carcasses. Then, when the arms are closed, the movement of the hog carcass C by the overhead conveying device 182 phases the hog carcass configurer 10 with the movement of the hog carcass C. As the hog carcass C moves, the leaf lard puller is actuated to go into the configured hog carcass C and remove the leaf lard. The opposable arms 72, 73 are then opened and the connecting member 60 is moved back to the first position. At this time, the clutch mechanism 43 is actuated thereby causing the drive belt 32 to be clamped. The drive belt 32 is continually moving in a counterclockwise direction, as viewed in FIG. 1. Therefore, as the clutch mechanism 43 is actuated, the clutch mechanism 43 will carry the carriage frame back to the right to the starting position. The clutch mechanism 43 is then released allowing the belt 32 to continue to move without causing any movement of the carriage 40.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for configuring an animal carcass for processing by a leaf lard puller, the carcass has been split longitudinally through its backbone, such as a hog carcass, the carcass being suspended on a conveyor, the apparatus comprising:
   a) a frame;
   b) a carriage operatively connected to the frame for movement in alignment with a conveyor suspending a hog;
   c) a connecting member having a first end and a second end, the first end operatively connected to the carriage and the second end moveable between a first position and a second position;
   d) first and second opposable arms operatively connected to the connecting member proximate its second end, the arms moveable between an open position and a configuring position; and
   e) a drive mechanism for moving the carriage on the frame, wherein the arms are positioned around the hog carcass in the open position and as the arms move to the configuring position the hog carcass is moved to a desired sized for use with a leaf lard puller.

2. The apparatus of claim 1, wherein the first end of the connecting member is pivotally connected to the carriage.

3. The apparatus of claim 2, further comprising an air cylinder operatively connected to the connecting member and the carriage, whereby actuating of the air cylinder pivots the connecting member between the first and second positions.

4. The apparatus of claim 1, further comprising a closing mechanism operatively connected to the arms, wherein both arms are moved when moving from the open position to the configuring position.

5. The apparatus of claim 4, further comprising a first air cylinder operatively connected to the first arm and a second air cylinder operatively connected to the second arm, the cylinders for moving the arms between the open position and the configuring position.

6. The apparatus of claim 1, the drive mechanism comprising:
   a) a motor;
   b) a drive belt rotatably mounted on the frame, the drive belt driven by the motor; and
   c) a clutch mechanism operatively connected to the carriage, the clutch mechanism for selectively engaging the drive belt.

7. The apparatus of claim 1, further comprising:
   a) a second connecting member having a first end and a second end, the first end operatively connected to the carriage and a second end moveable between a first position and a second position; and
   b) third and fourth opposable arms operatively connected to the second connecting member proximate its second end, the third and fourth arms movable between an open position and a closed position.

8. An apparatus for configuring an animal carcass for processing by a leaf lard puller, the carcass has been split longitudinally through its backbone, such as a hog carcass, the carcass being suspended on a conveyor, the apparatus comprising:

a) a frame;

b) a carriage operatively connected to the frame for movement in alignment with a conveyor suspending a hog;

c) a connecting member operatively connected to the carriage and moveable between a first position and a second position;

d) a pair of opposable arms operatively connected to the connecting member and moveable between an open position and a configuring position; and e) a drive mechanism for moving the frame from an ending position to a starting position, whereby the frame is moved from the starting position to the ending position by phasing movement of the carriage with movement of the hog by the opposable arms in the configuring position around the hog.

9. The apparatus of claim 8, the connecting member having a first end pivotally connected to the carriage and a second end operatively connected to the pair of opposable arms.

10. The apparatus of claim 9, further comprising an air cylinder operatively connected to the connecting member and the carriage, whereby actuating of the air cylinder pivots the connecting member between the first and second positions.

11. The apparatus of claim 8, further comprising a closing mechanism operatively connected to the arms, wherein both arms are moved when moving from the open position to the configuring position.

12. The apparatus of claim 11, further comprising first and second air cylinders, each operatively connected to one of the opposable arms, the air cylinders moving the arms between the open position and the configuring position.

13. The apparatus of claim 8, further comprising:

a) a motor;

b) a drive belt rotatably mounted on the frame, the drive belt driven by the motor; and c) a clutch mechanism operatively connected to the carriage, the clutch mechanism for selectively engaging the drive belt.

14. The apparatus of claim 8, further comprising:

a) a second connecting member operatively connected to the frame for movement in alignment with a conveyor suspending a hog; and b) a second pair of opposable arms operatively connected to the carriage and movable between a first position and a second position.

15. A method of configuring a split hog carcass for processing by a leaf lard puller, as the carcass is moved along a conveyor, comprising:

a) moving a connecting member from a first position to a second position, wherein arms are positioned around a hog carcass;

b) moving the arms from an open position to a configuring position, wherein the hog carcass is configured to be processed by a leaf lard puller;

c) moving the arms back to an open position; and d) moving the connecting member back to the first position.

16. The method of claim 14, further comprising moving a carriage that carries the connecting member, from a first position to a second position by the arms grasping the hog carcass and the conveyor thereby moving the carriage.

17. The method of claim 15, further comprising engaging a drive mechanism to move the carriage from the second position back to the first position.

* * * * *